March 30, 1954
W. D. BENSINGER
2,673,662
DEVICE FOR FUEL-METERING IN PARTICULAR, FUEL-INJECTION
FOR INTERNAL-COMBUSTION ENGINES
Filed Sept. 27, 1949
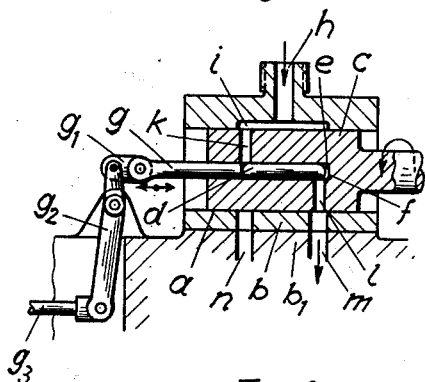
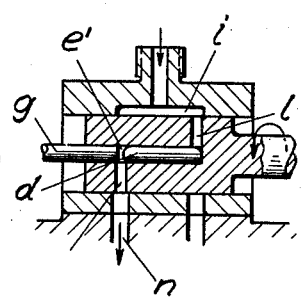
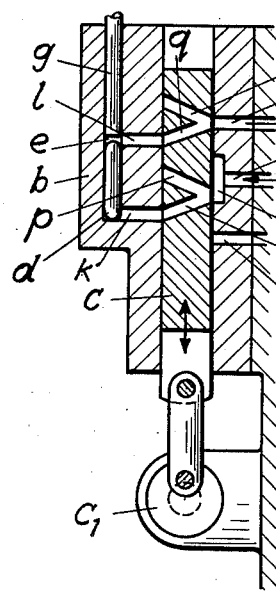
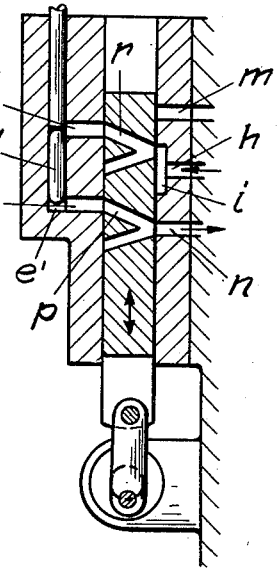
INVENTOR
WOLF DIETER BENSINGER
By Haseltine Lake & Co.
AGENTS Patented Mar. 30, 1954

2,673,662

UNITED STATES PATENT OFFICE 2,673,662

DEVICE FOR FUEL-METERING, IN PARTICULAR, FUEL-INJECTION FOR INTERNAL-COMBUSTION ENGINES

Wolf Dieter Bensinger, Muhlacker (Wurtt), Germany, assignor to Daimler-Benz Aktiengesellschaft, Stuttgart-Unterturkheim, Germany Application September 27, 1949, Serial No. 118,093

Claims priority, application Germany October 1, 1948

1 Claim. (Cl. 222—250)

The invention relates to a device for fuel-metering, in particular, fuel-injection for internal-combustion engines.

It is, above all, an object of the invention to render possible a very accurate and uniform metering of fuel charges, even, when minute amounts are to be measured, and to overcome thereby the difficulties experienced in conventional fuel-injection pumps.

It is another object of the invention to provide a device for such an accurate and uniform fuel-metering, for instance, of the fuel charge to be injected in sequence at each combustion period, that even at the highest engine speeds or highest rate of injections per minute (for example, up to 30,000 per minute) an accurate and uniform fuel-metering is assured.

The invention, above all, is applicable to low-pressure injection, for instance, gasoline injection, if occasion arises it may, however, also be employed for high-pressure injection.

A feature of the present invention, consists essentially in that a charge of fuel of the right amount for one injection is divided off from the inflowing fuel, and hereupon this divided off and metered amount is displaced by the pressure of the subsequently inflowing fuel and then conducted to the injection point. As a rule, the fuel is delivered to the metering device under the same pressure as that of the subsequently inflowing fuel, by which it is pushed to the injection points. Fuel-displacement and metering of the subsequently inflowing fuel are here so interdependent that a practically perfect, uniform metering is attained, since only as much fuel flows into the metering device as can flow out of it.

For the practical application of the invention there is provided, in particular, a free moving, for example, reciprocating needle-like, or pin-like plunger member which is alternately seated by the fuel pressure on one or the other plunger side, whereby the plunger member performs a certain limited stroke, and thereby the fuel on the opposite side is metered and forced into the injection line.

For fuel control there is provided, for example, a rotary valve, in the interior of which the metering and displacing plunger may be arranged, whereby an especially compact form is attained. To obviate or diminish the danger of seizing, which is especially evident in connection with gasoline operation and rotary valves, it is, however, appropriate under certain circumstances to make provision for a reciprocating valve, and preferably to arrange the plunger member outside of the latter. The employment of a needle-like, or pin-like plunger member of small diameter, secures the further advantages that the mass of the plunger member may be kept very small which is of essential importance especially for a very high rate of strokes, that the fuel-metering and regulation of the same may be accomplished with the greatest accuracy by changing the stroke, and that leaking on the bearing surfaces of the plunger barrel is practically impossible. Furthermore, the device is of simplest design, and with respect to space and weight affords no outlay that needs to be considered in any way at all. Also the regulation of the fuel charge may be controlled in the simplest manner, selectively or automatically, for example, in dependence upon the engine speed by changing the stroke of the plunger. Furthermore, driving pressure and regulating pressure are very low.

The invention is, in particular, applicable for engines with injection points becoming effective by pairs in sequence, the fuel being delivered to one pair, or several pairs of injection points by one device. However, each device may merely deliver fuel to one individual injection point, by bringing the injection line into communication alternately with one or the other side of the plunger member.

In the drawing two fuel-metering devices, in which the invention is embodied, are illustrated diagrammatically by way of example, in a somewhat simplified manner, Figs. 1 and 2 being one embodiment, and Figs. 3 and 4 the other embodiment which forms the subject matter of a divisional application to be filed at a later date, and in both embodiments, the plunger or control member is shown in one or the other of the end or control positions.

In a bore $a$ of a metering-device housing $b$ (Fig. 1), attached, for instance, to the engine housing $b_1$, a control valve $c$ rotates, being driven, for example, at one-half crankshaft revolutions by the engine that is to be supplied with the fuel charge by means of a toothed wheel. In a centrally located small bore, the needle-like plunger member $d$, provided with rounded ends as a plunger crown, is supported, with axial clearance $e$ (Fig. 1) or $e'$ (Fig. 2), between the end surface $f$ of the bore and the needle-like axially adjustable regulating rod $g$. The latter may be adjusted, manually or in some other way directly or, for instance, by a shackle $g_1$, a lever $g_2$, and a rod $g_3$. The fuel, for instance, being conveyed by a diaphragm pump serving as delivery pump, flows at $h$ into a control slot $i$, from which, depending on the rotary position of the control valve $c$, it flows either through the cross bore $k$ (Fig. 1) or through the cross bore $l$ into the right-hand side of the plunger member $d$. The momentary opposite plunger end is, at this instant, either in communication with the injection line $m$ (Fig. 1) through the cross bore $l$, or in communication with the injection line $n$ (Fig. 2) through the cross bore $k$.

In the rotary position according to Fig. 1, the plunger member $d$ is first in the left-hand position as shown. Through the fuel entering by way of $k$ it is pushed towards the right against a stop at the end face $f$ by the pressure of the feed pump. Coincidently it pushes the fuel, which previously has been confined at $e$, through $l$ into the injection line $m$, in a metered quantity in accordance with the diameter and stroke of the plunger member. Simultaneously with this, the same amount of fuel has entered at the left-hand plunger side (proportionately to clearance $e'$ Fig. 2), and is there shut off from the rest of the inflowing fuel by further rotation of the valve $c$. As soon as the valve, after one-half rotation, has reached the rotary position according to Fig. 2, the fuel through $l$ passes over to the right-hand plunger side, whereby $d$ is pushed towards the left, and the fuel, which previously has been confined at $e'$, is then through $k$ pushed into the injection line $n$. As long as the setting of the regulating rod $g$ is not changed, the amount of fuel actually displaced and injected will always be constant. By an axial displacement of $g$, however, the stroke of the plunger member $d$ and, by this way, the quantity of the inflowing and the displaced fuel may be changed and regulated.

Instead of only one transverse bore $k$ and one transverse bore $l$ arranged in the control valve, there may be provided several of them distributed on the circumference of the control valve and adapted to deliver fuel to a corresponding number of injection points. Generally, a feeding pressure of the feeding pump of approximately 4 lb. per sq. in. above the pressure in the cylinders is sufficient. Therefore, for example, for gasoline injection into the suction manifold, or into the uncompressed or low-compressed working air in the cylinder, the pump may work with relative low pressures. Nevertheless, in conformity with the invention, pressures of 1400 lb. per sq. in. or more can also be controlled by the device.

In the embodiment of the invention according to Figs. 3 and 4 the plunger member $d$ is situated outside of the control valve $c$ which in this instance is developed as reciprocating valve, for example, driven by an eccentric $c_1$. The bores $k$ and $l$ are arranged in a fixed housing, so that they always deliver the fuel to the same plunger side. Four bores $o, p, q, r$ serve as control. In one end position of the control valve $c$, the bore $o$ controls the inflow of the fuel from $h$ to $k$, and likewise, the bore $q$ the outflow of the fuel, displaced at $e$, from $l$ to the injection line $m$. In the other end position of the control valve $c$, the bore $p$ serves the purpose to conduct the fuel, displaced at $e'$, to the injection line, while the bore $r$ controls the inflow of the fuel from $h$ to $l$. Otherwise, the manner of operation is, on principle, the same as in the embodiment according to Figs. 1 and 2. The device according to Figs. 3 and 4 offers the advantage of lesser sensitiveness against seizing, especially, in connection with gasoline operation. But it is also useable to advantage for other fuels and other applications.

Although only two preferred forms and applications of the invention have been described in detail, it will be apparent to those skilled in the art that various modifications may be made without departing from the scope of the appended claim.

What I claim is:

A fluid metering and supply device comprising a housing having a cylindrical bore therein, a control valve mounted for rotation in said bore and having a longitudinal bore therein, a needle-shaped piston member axially movable in the valve bore and having rounded ends, a pair of abutments limiting the stroke of the piston member and defining therewith two end chambers in the valve bore, one abutment being integral with the valve and the other comprising an abutment rod slidable axially in the valve bore independently of the rotation of the valve, a supply duct leading into the housing and including a longitudinal groove in the surface of the housing bore at one side thereof and of a length corresponding to the axial length of the valve bore including the two end chambers, a pair of ducts in the valve extending radially thereof in opposite directions from the two end chambers to the surface of the valve, and a pair of delivery ducts extending through the other side of the housing and spaced apart a distance corresponding to the distance between the two end chambers in the control valve, whereby, upon rotation of the valve through an angle of 180° from a position in which one of the valve ducts communicates with the groove and the other with one of the delivery ducts, the one valve duct will be placed in communication with the other delivery duct and the other valve duct with the groove, and vice versa upon further rotation.

WOLF DIETER BENSINGER.

References Cited in the file of this patent

UNITED STATES PATENTS

| Number | Name | Date |
|---|---|---|
| 312,872 | Lord | Feb. 24, 1885 |
| 703,410 | Hartness | July 1, 1902 |
| 982,601 | Hardy | Jan. 24, 1911 |
| 1,292,981 | Weiss | Jan. 28, 1919 |
| 1,805,609 | Wilson | May 19, 1931 |
| 1,995,601 | Browne | Mar. 26, 1935 |
| 2,110,405 | Starr | Mar. 8, 1938 |
| 2,453,196 | Clark | Nov. 9, 1948 |
| 2,527,615 | Beale | Oct. 31, 1950 |
| 2,576,747 | Bryant | Nov. 27, 1951 |